(12) United States Patent
Ito et al.

(10) Patent No.: US 12,255,418 B2
(45) Date of Patent: Mar. 18, 2025

(54) CONNECTOR FOR PHOTOELECTRIC CONVERSION MODULE AND CONNECTOR ASSEMBLY FOR PHOTOELECTRIC CONVERSION MODULE

(71) Applicant: Yamaichi Electronics Co., Ltd., Tokyo (JP)

(72) Inventors: Toshiyasu Ito, Tokyo (JP); Masaaki Saito, Tokyo (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 423 days.

(21) Appl. No.: 17/767,024

(22) PCT Filed: Oct. 9, 2019

(86) PCT No.: PCT/JP2019/039746
§ 371 (c)(1),
(2) Date: Apr. 6, 2022

(87) PCT Pub. No.: WO2021/070273
PCT Pub. Date: Apr. 15, 2021

(65) Prior Publication Data
US 2022/0393392 A1    Dec. 8, 2022

(51) Int. Cl.
*H01R 13/533* (2006.01)
*H02S 40/36* (2014.01)

(52) U.S. Cl.
CPC ........... *H01R 13/533* (2013.01); *H02S 40/36* (2014.12)

(58) Field of Classification Search
None
See application file for complete search history.

(56) References Cited

U.S. PATENT DOCUMENTS 10,797,417 B2 * 10/2020 Scholeno ................. G02B 6/42
10,944,189 B2 *  3/2021 Xu .......................... H01R 12/75
(Continued)

FOREIGN PATENT DOCUMENTS

CN        2559044 Y    7/2003
CN      102473981 A    5/2012
(Continued)

OTHER PUBLICATIONS

International Search Report issued for International Application No. PCT/JP2019/039746, entitled "Connector for Photoelectric Conversion Module and Connector Assembly for Photoelectric Conversion Module," mailed Nov. 12, 2019.

*Primary Examiner* — Ross N Gushi
(74) *Attorney, Agent, or Firm* — Hamilton, Brook, Smith & Reynolds, P.C.

(57) ABSTRACT

A connector (7) includes: a first connector part (10) having a first module side connection part connected to one end of an OSFP module in the front (F), having a first substrate side connection part connected to a substrate, and installed on the substrate; a second connector part (20) provided at a position such that the first module side connection part is interposed between the substrate and the second connector part (20), having a second module side connection part connected to one end of an OSFP module at the front (F), having a second substrate side connection part connected to the substrate, and stacked on the first connector part (10); and an intermediate part (30) provided between the first connector part (10) and the second connector part (20), and a cooling flow path in which air flows from the front (F) side toward the rear (R) side of the connector (7) is formed in the intermediate part (30).

6 Claims, 7 Drawing Sheets

(56) References Cited

U.S. PATENT DOCUMENTS

| | | |
|---|---|---|
| 2006/0003632 A1 | 1/2006 | Long |
| 2012/0214041 A1 | 8/2012 | Harada et al. |
| 2018/0278000 A1 | 9/2018 | Regnier |
| 2019/0089106 A1 | 3/2019 | Regnier |

FOREIGN PATENT DOCUMENTS

| | | |
|---|---|---|
| CN | 108140985 A | 6/2018 |
| CN | 208754623 U | 4/2019 |
| JP | S53151555 U | 11/1978 |
| JP | S5520203 U | 2/1980 |
| JP | S56164598 U | 12/1981 |
| JP | 2015076173 A | 4/2015 |
| JP | 2017505520 A | 2/2017 |
| JP | 2017510031 A | 4/2017 |
| JP | 2018528597 A | 9/2018 |

* cited by examiner

CONNECTOR FOR PHOTOELECTRIC CONVERSION MODULE AND CONNECTOR ASSEMBLY FOR PHOTOELECTRIC CONVERSION MODULE

This application is the U.S. National Stage of International Application No. PCT/JP2019/039746, filed Oct. 9, 2019, which designates the U.S., published in Japanese. The entire teachings of the above application are incorporated herein by reference.

TECHNICAL FIELD

The present invention relates to a connector for photoelectric conversion modules suitable for use of a photoelectric conversion module such as an Octal Small Form Factor Pluggable (OSFP) module, for example, and to a connector assembly for photoelectric conversion modules.

BACKGROUND ART

In a photoelectric conversion module used for an OSFP or the like, efficient cooling of a photoelectric conversion module that is a heat generating member is required due to a demand for a higher speed or a larger capacity. Further, cooling of a connector for photoelectric conversion modules that electrically connects the photoelectric conversion modules to a substrate needs to be considered in addition to the cooling of the photoelectric conversion modules.

Patent Literature 1 discloses a cage having two ports arranged vertically. The cage is provided with a bent wall in which a bent opening is formed between the ports, and thereby an air flow flowing through the cage is improved to enhance the cooling performance.

Patent Literature 2 discloses that a cooling groove is formed in a body of a plug assembly, and this cooling groove is used to improve an air flow flowing in a port and increase the cooling efficiency.

CITATION LIST

Patent Literature

[PTL 1]
Japanese Patent Application Laid-Open No. 2017-505520
[PTL 2]
Japanese Patent Application Laid-Open No. 2017-510031

SUMMARY OF INVENTION

Technical Problem

Although cooling for an assembly having photoelectric conversion modules is considered in Patent Literatures 1 and 2, cooling of a connector for photoelectric conversion modules is not specifically considered.

The present inventors have found through an intensive study that, in a stack type connector in which a first connector part and a second connector part are stacked one another on a substrate, the first connector part is not efficiently cooled because the first connector part is interposed between the substrate and the second connector part.

The present invention has been made in view of such circumstances and intends to provides a connector for photoelectric conversion modules and a connector assembly for photoelectric conversion modules that can effectively cool a connector in which a first connector part and a second connector part are stacked on each other.

Solution to Problem

A connector for photoelectric conversion modules according to one aspect of the present invention includes: a first connector part having a first module side connection part connected to one end of a first photoelectric conversion module in the front of the connector, having a first substrate side connection part connected to a substrate, and installed on the substrate; a second connector part provided at a position such that the first module side connection part is interposed between the substrate and the second connector part, having a second module side connection part connected to one end of a second photoelectric conversion module at the front of the connector, having a second substrate side connection part connected to the substrate, and stacked on the first connector part; and an intermediate part provided between the first connector part and the second connector part, and a cooling flow path in which a cooling medium flows from the front side toward the rear side of the connector is formed in the intermediate part.

The first connector part is provided on the substrate, and the second connector part is stacked on the first connector part. Accordingly, a stack type connector is formed.

A cooling medium such as air flows from the front side toward the rear side of the photoelectric conversion module by a fan device such as a fan. The cooling medium that has passed through the photoelectric conversion module flows to the first connector part and the second connector part connected to the rear end (one end) of the photoelectric conversion module. Since the first connector part and the second connector part are stacked on each other, it appears that the intermediate part provided between the first connector part and the second connector part may be a resistance to a cooling medium and obstruct a smooth flow of the cooling medium. In particular, since the first connector part is installed on the substrate and interposed between the second connector part and the substrate, there may be a concern about reduced cooling performance.

To address this, a cooling flow path in which the cooling medium flows from the front side toward the rear side of the connector is formed in the intermediate part. This enables the cooling medium to flow so as to pass through the intermediate part, and the first connector part can be effectively cooled.

Furthermore, in the connector for photoelectric conversion modules according to one aspect of the present invention, the intermediate part includes a tapered part whose width increases from the front side toward the rear side.

The tapered part is provided in the intermediate part. The tapered part is formed such that the width thereof increases from the front side toward the rear side. Accordingly, a cooling medium that has flown in from the front side flows along the tapered part and thereby flows toward both sides of the intermediate part, and a smooth cooling flow path can be formed.

As the tapered part, for example, a wedge shape such as a triangle is preferably used.

Furthermore, in the connector for photoelectric conversion modules according to one aspect of the present invention, the intermediate part is provided with a side wall connected to the tapered part and configured to guide a cooling medium to the rear.

The cooling medium guided by the tapered part is caused to flow along the side wall and thereby pass therethrough to the rear side. This enables a cooling medium to flow so as to pass through the connector for photoelectric conversion modules and can further increase the cooling effect.

Furthermore, in the connector for photoelectric conversion modules according to one aspect of the present invention, the first connector part, the second connector part, and the intermediate part are integrally configured.

The integral configuration of the first connector part, the second connector part, and the intermediate part can reduce the number of components.

Furthermore, in the connector for photoelectric conversion modules according to one aspect of the present invention, the second connector part and the intermediate part are integrally configured and separated from the first connector part.

The second connector part and the intermediate part are integrated with each other and separated from the first connector part. Such a separate type configuration can increase flexibility of design or assembly.

A connector assembly for photoelectric conversion modules according to one aspect of the present invention includes: at least one connector for photoelectric conversion modules according to any one of the above, a substrate on which the connector for the photoelectric conversion module is installed; and a cage fixed to the substrate and provided so as to cover the connector for the photoelectric conversion module.

The connector assembly for photoelectric conversion modules is formed of the connector for photoelectric conversion modules, the substrate, and the cage. The cooling medium will flow inside the space formed by the cage. Efficient flow of the cooling medium flowing in the cage can enhance cooling of the connector for photoelectric conversion modules.

Furthermore, in the connector assembly for photoelectric conversion modules according to one aspect of the present invention, a discharge flow path configured to cause a cooling medium around the connector for photoelectric conversion modules to flow to outside is formed in the cage.

The discharge flow path configured to cause a cooling medium around the connector for photoelectric conversion modules to flow to outside is provided in the cage. Accordingly, for example, the cooling medium flowing out of the connector for photoelectric conversion modules is smoothly discharged to outside, and this can facilitate the flow of the cooling medium flowing in the cage. As the discharge flow path, for example, a plurality of through holes may be provided in a wall of the rear end and/or the back wall of the cage.

Furthermore, in the connector assembly for photoelectric conversion modules according to one aspect of the present invention, a plurality of connectors for photoelectric conversion modules are arranged in parallel. A plurality of through holes are formed in a partition wall of the cage, and the partition wall is provided between the connectors for photoelectric conversion modules arranged in parallel.

The connectors for photoelectric conversion modules are arranged in parallel, and the module side connection parts are arranged in 2×N (N is an integer greater than or equal to two). In such a case, a plurality of through holes are formed in each partition wall of a cage that partitions respective connectors for photoelectric conversion modules from each other. Accordingly, a flow of a cooling medium can be formed interposing the partition wall, and the cooling efficiency can be further enhanced.

Advantageous Effects of Invention

Since the intermediate part in which a cooling flow path is formed between the first connector part and the second connector part is provided, the connector for photoelectric conversion modules can be effectively cooled.

DESCRIPTION OF EMBODIMENTS

One embodiment according to the present invention will be described below with reference to the drawings.

Figure 1:
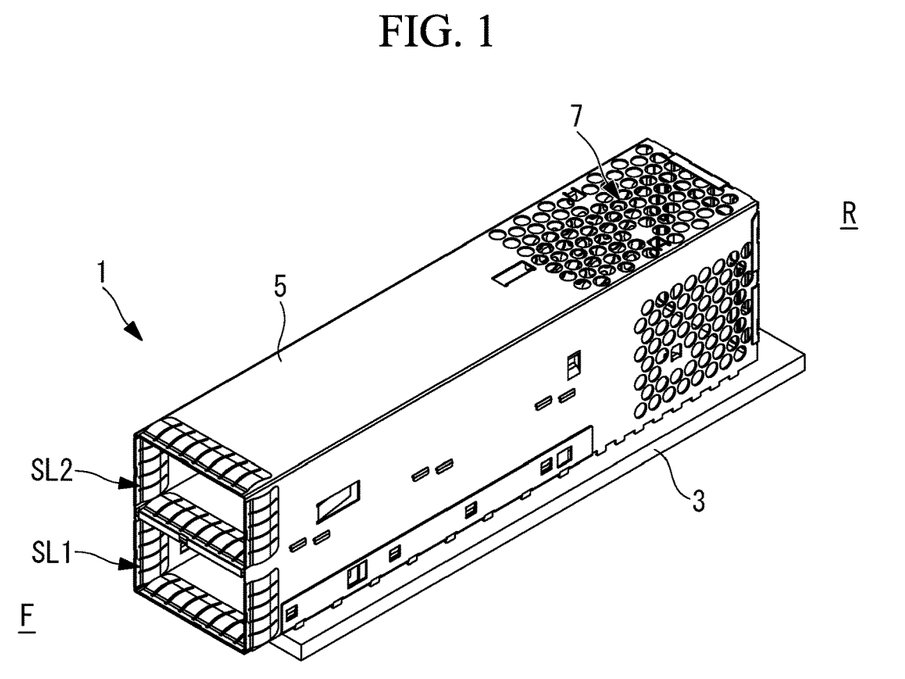
FIG. 1 is a perspective view illustrating a connector assembly for photoelectric conversion modules according to one embodiment of the present invention.

FIG. 1 illustrates a connector assembly (connector assembly for photoelectric conversion modules) 1 for connection of OSFP modules (photoelectric conversion modules). Although not illustrated, an OSFP module contains a photoelectric conversion element as a heat generating member.

The connector assembly 1 includes a substrate 3, a cage 5 fixed to the substrate 3, and a connector (connector for photoelectric conversion modules) 7 fixed onto the substrate and housed in the cage 5.

[Configuration of Cage 5]

The cage 5 is made of a metal and has a substantially rectangular parallelepiped shape, and two slots SL1 and SL2 are provided vertically in the front F. Note that, in FIG. 1, the substrate 3 is arranged underside.

An OSFP module (not illustrated) is inserted in each of the slots SL1 and SL2 in the longitudinal direction, and the rear end of each OSFP module (the right end in FIG. 1) is connected to the connector 7.

Figure 2:
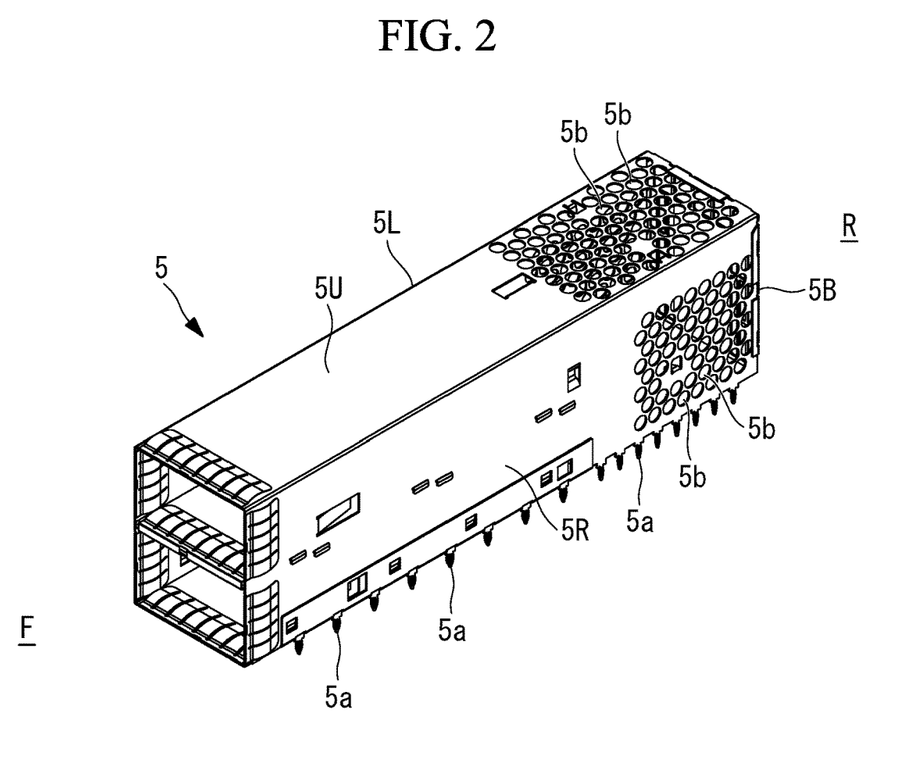
FIG. 2 is a perspective view illustrating a cage of FIG. 1.

As illustrated in FIG. 2, the cage 5 has a right side wall 5R, a left side wall 5L, an upper wall 5U, and a back wall 5B. The cage 5 has no bottom wall. Therefore, the underside of the cage 5 is opened.

The cage 5 has a plurality of hooks 5a protruding downward on the lower edges of the right side wall 5R and the left side wall 5L. Respective hooks 5a are put into insertion holes (not illustrated) formed in the substrate 3, and thereby the cage 5 is positioned and fixed to the substrate 3.

A plurality of cooling holes (discharge flow paths) 5b are formed on the rear R side of the cage 5. The cooling holes 5b are provided to each of the right side wall 5R, the left side wall 5L, and the upper wall 5U of the cage 5. The cooling holes 5b are provided in association with the position of the connector 7 (see FIG. 1). The shape of each cooling hole 5b is preferably a circle for an EMI measure. However, the shape of the cooling hole 5b may be other shapes such as a polygon.

Figure 3:
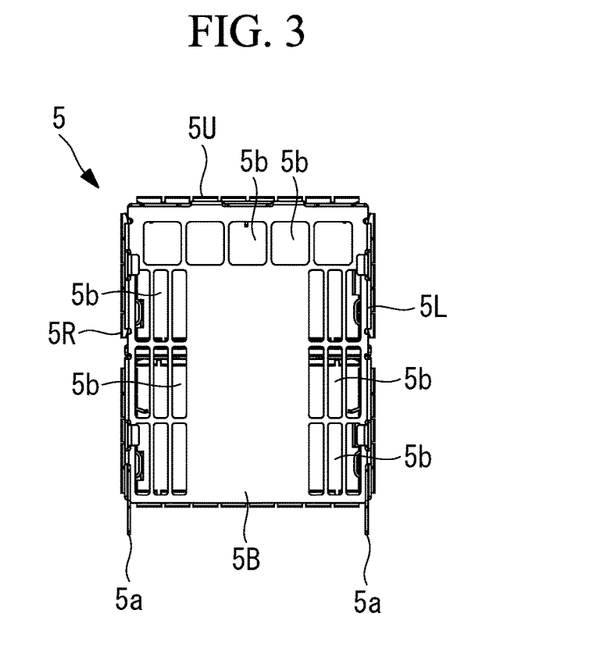
FIG. 3 is a backside view illustrating a back wall of the cage of FIG. 2.

FIG. 3 illustrates a back wall 5B of the cage 5. A plurality of cooling holes 5b are formed also in the back wall 5B. Specifically, a plurality of cooling holes 5b are formed along the right edge and the left edge of the back wall 5B, and a plurality of cooling holes 5b are further formed along the upper edge. Therefore, the center region of the back wall 5B is a solid wall face, and no cooling hole 5b is formed therein. However, the cooling hole 5b may be formed in the center region of the back wall 5B.

[Configuration of Connector 7]

Figure 4:
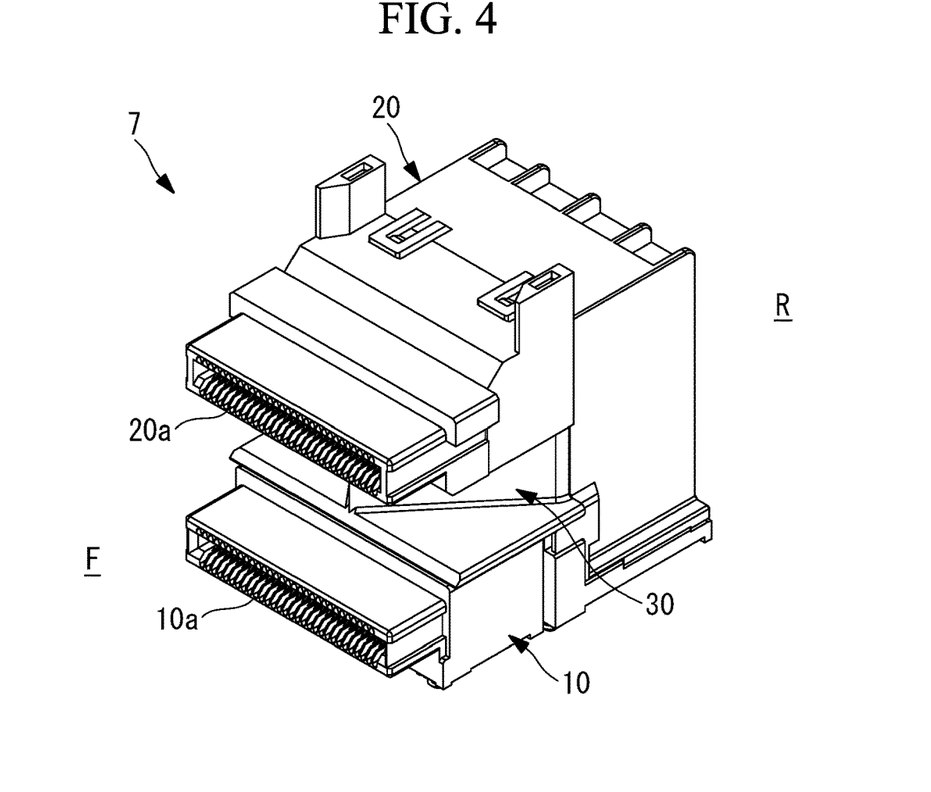
FIG. 4 is a perspective view illustrating a connector of FIG. 1.

FIG. 4 illustrates the connector 7.

The connector 7 includes a first connector part 10 located at the bottom, namely, on the substrate 3 (see FIG. 1) side and a second connector part 20 stacked on the first connector part 10. In the present embodiment, the first connector part 10 and the second connector part 20 are independent structures, respectively. Further, the first connector part 10 and the second connector part 20 are not physically connected to each other by fitting or the like even when installed to the substrate 3 as illustrated in FIG. 1.

The rear end of the OSFP module inserted in the lower slot SL1 (see FIG. 1) of the cage 5 is connected to a first module connection part 10a provided in the front F of the first connector part 10, and the rear end of the OSFP module inserted in the upper slot SL2 (see FIG. 1) of the cage 5 is connected to a second module connection part 20a provided in the front F of the second connector part 20.

An intermediate part 30 is provided between the first module connection part 10a and the second module connection part 20a. In the present embodiment, the intermediate part 30 is integrally formed with the second connector part 20.

[Configuration of First Connector Part 10]

Figure 5:
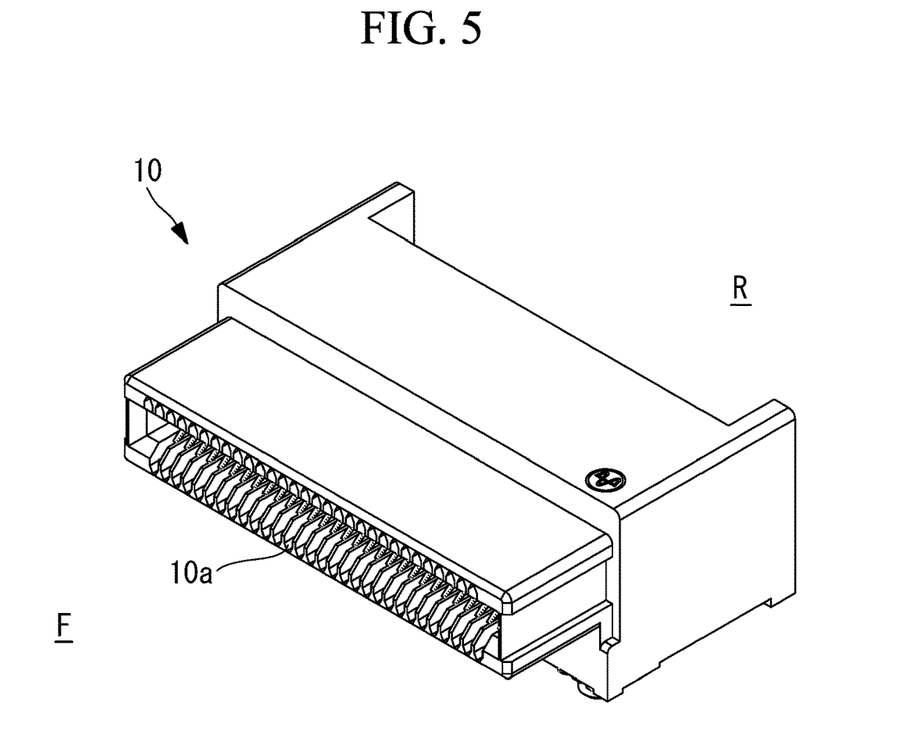
FIG. 5 is a perspective view illustrating a first connector part of FIG. 4.

FIG. 5 illustrates the first connector part 10.

Figure 6:
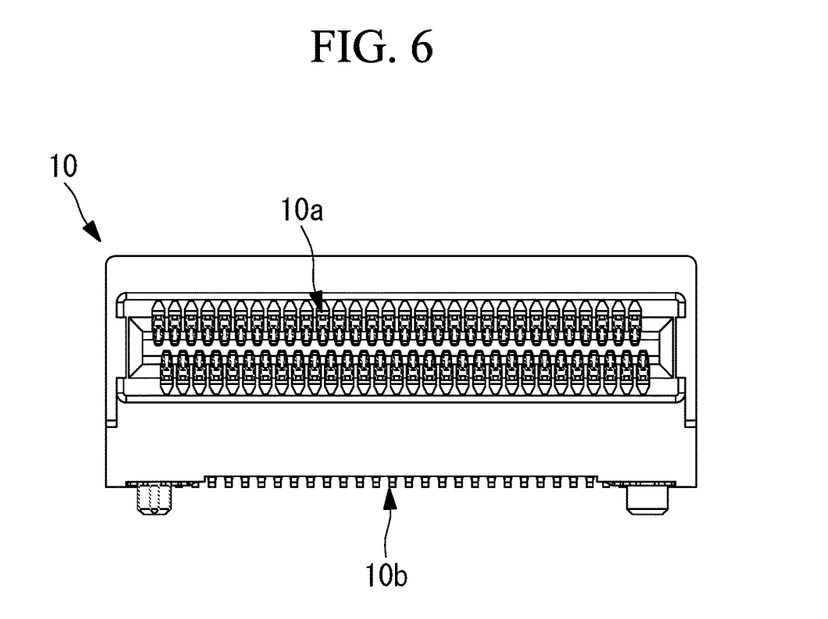
FIG. 6 is a front view illustrating the first connector part of FIG. 5.

The first connector part 10 has a wide, substantially rectangular parallelepiped shape whose dimension in the width direction is larger than that in the longitudinal direction from the front F toward the rear R. The first connector part 10 includes the first module connection part 10a at the front end and includes a first substrate side connection part 10b on the bottom side, as illustrated in FIG. 6. The first module connection part 10a and the first substrate side connection part 10b are electrically connected to each other.

Figure 7:
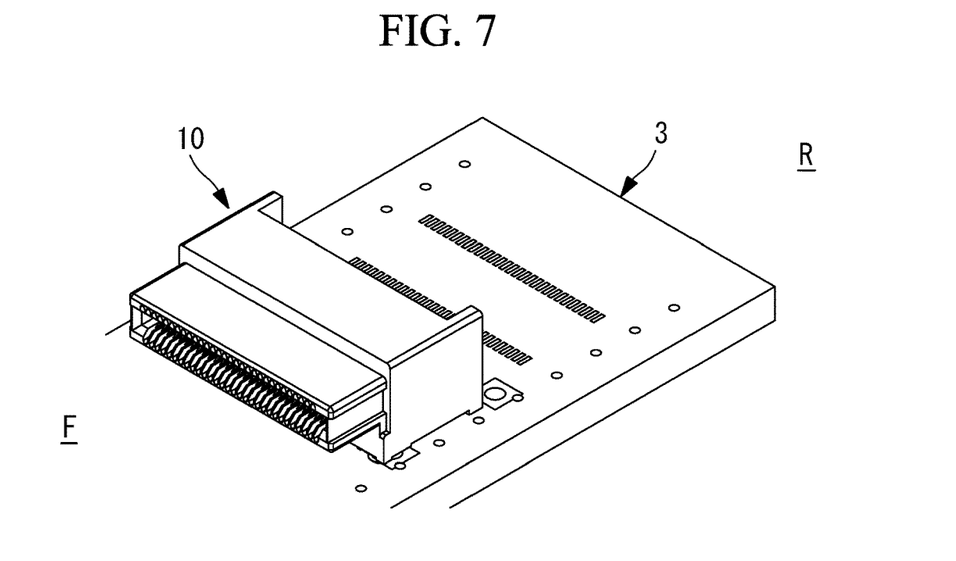
FIG. 7 is a perspective view illustrating a state where the first connector part is installed on a substrate.

As illustrated in FIG. 7, the first connector part 10 is arranged on the substrate 3, and thereby the circuit pattern of the substrate 3 and the first substrate side connection part 10b of the first connector part 10 are conducted.

[Configuration of Second Connector Part 20]

Figure 8:
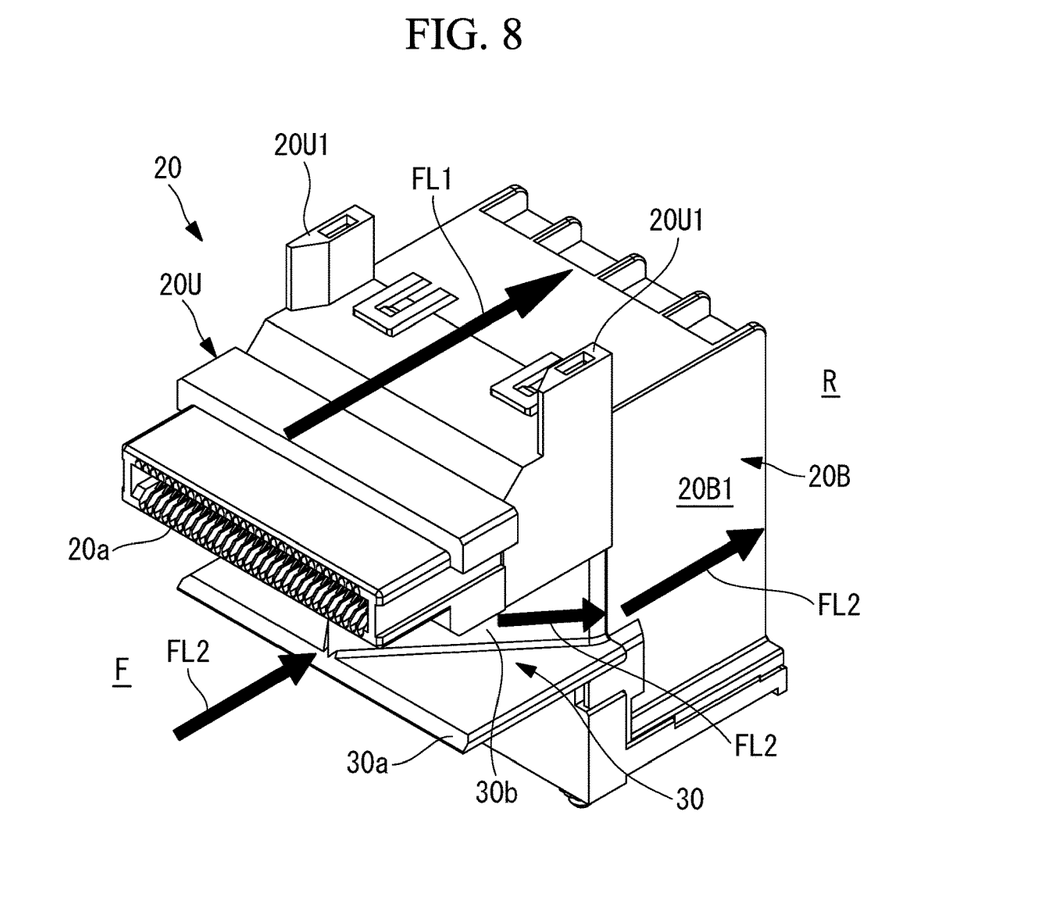
FIG. 8 is a perspective view illustrating a second connector part of FIG. 4.

FIG. 8 illustrates the second connector part 20.

The intermediate part 30 is integrally formed to the second connector part 20. The second connector part 20 having the intermediate part 30 has a vertically inversed substantial L-shape in side view. The second connector part 20 includes an upper part 20U including the second module connection part 20a in the front F and includes a vertically extending back part 20B connected to the rear R of the upper part 20U.

The upper part 20U has a wide, substantially rectangular parallelepiped shape whose dimension in the width direction is larger than that in the longitudinal direction from the front F toward the rear R. The upper surface of the upper part 20U is provided with two pillars 20U1 arranged extending upward from both edges. A clearance is secured between the upper surface of the upper part 20U and the upper wall 5U of the cage 5 (see FIG. 2) by the pillars 20U1. Cooling air (cooling medium) flows in this clearance.

The back part 20B has a vertical, substantially rectangular parallelepiped shape. The width (in the direction orthogonal to the direction from the front F to the rear R) of the back part 20B is narrower than the width of the upper part 20U. Accordingly, clearances are formed between both the side walls 5R, 5L of the cage 5 (see FIG. 2) and the right, left side parts 20B1 of the back part 20B. Cooling air (cooling medium) flows in these clearances.

Figure 9:
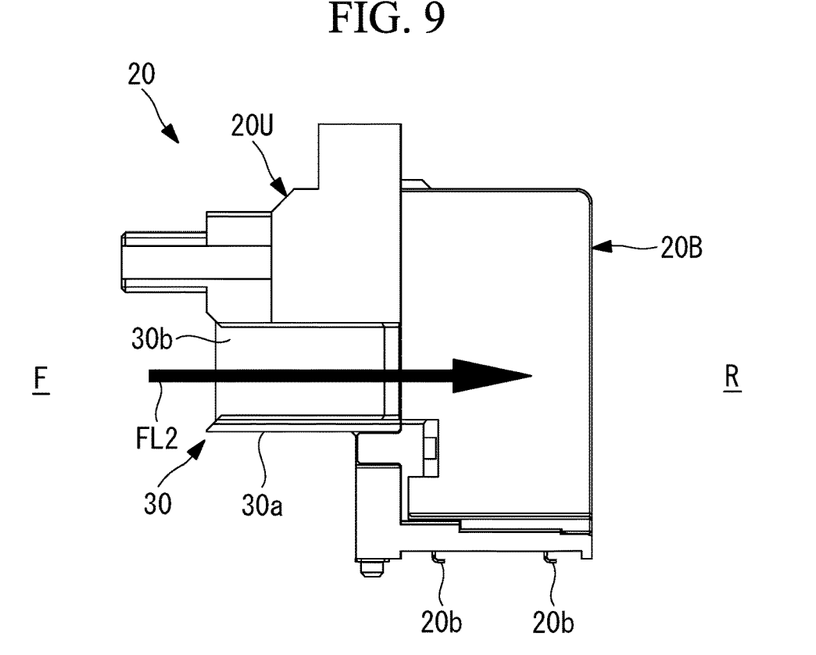
FIG. 9 is a side view of the second connector part of FIG. 8.

As illustrated in FIG. 9, a second substrate side connection part 20b is provided on the bottom side of the back part 20B. The second module connection part 20a and the second substrate side connection part 20b are electrically connected to each other.

Figure 10:
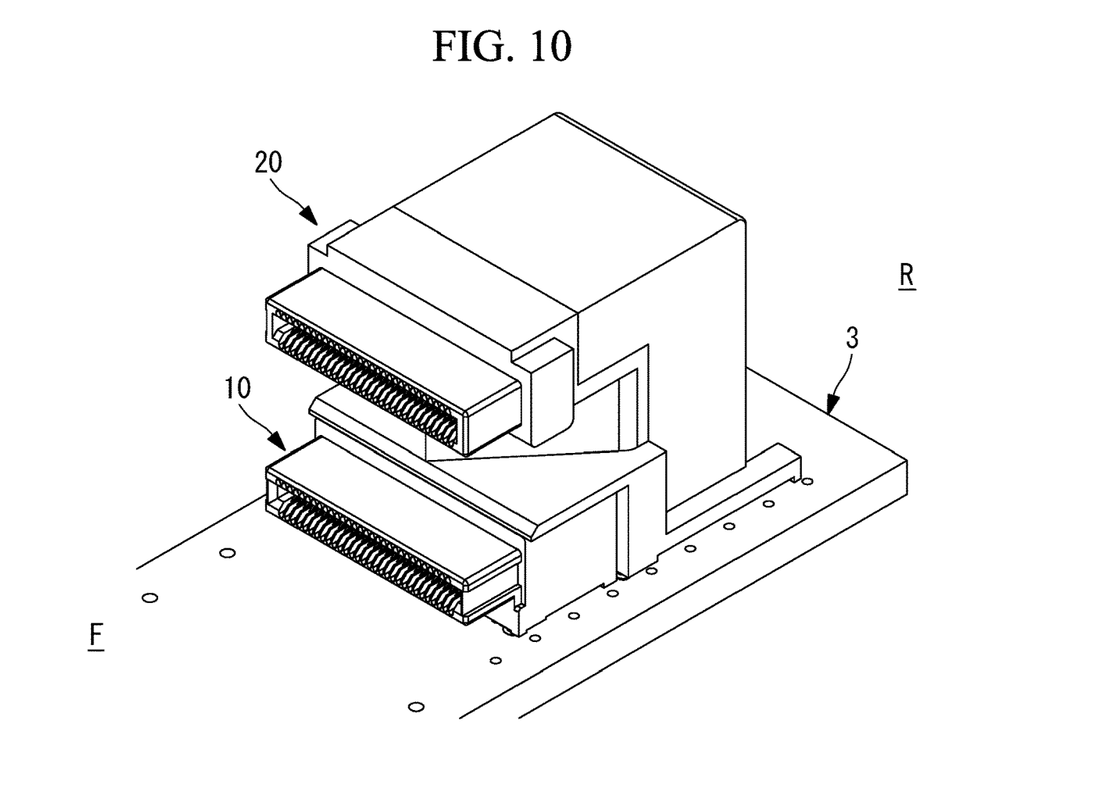
FIG. 10 is a perspective view illustrating a state where the second connector part is installed on the substrate in addition to the first connector part.

As illustrated in FIG. 10, the second connector part 20 is arranged on the substrate 3 so as to be stacked on the first connector part 10, and thereby the circuit pattern of the substrate 3 and the second substrate side connection part 20b of the second connector part 20 are conducted.

As illustrated in FIG. 8, the intermediate part 30 is located under the second module connection part 20a and includes a horizontal plate part 30a and a triangular prism part (tapered part) 30b provided on the horizontal plate part 30a.

The horizontal plate part 30a has a horizontally extending plate shape. The horizontal plate part 30a is arranged under the upper part 20U and spaced apart from the upper part 20U with a predetermined spacing. The horizontal plate part 30a is substantially rectangular in plan view. The horizontal plate part 30a is connected to the front end of the back part 20B and protrudes from the back part 20B toward the front F. The width of the horizontal plate part 30a is larger than the width of the back part 20B and substantially the same as the width of the upper part 20U. A space in which the first connector part 10 is arranged is formed under the horizontal plate part 30a (for example, see FIG. 10).

The triangular prism part 30b is provided between the upper surface of the horizontal plate part 30a and the under surface of the upper part 20U. The horizontal sectional shape of the triangular prism part 30b is a triangle whose width increases from the front F side toward the rear R side, in other words, whose width decreases from the rear R side toward the front F side. The vertex of the triangle of the triangular prism part 30b is located in the front F and located at substantially the center in the width direction.

[Cooling Air Flow of Second Connector Part 20]

Next, a flow of cooling air (cooling medium) provided using the second connector part 20 configured as described above will be described.

The cooling air is supplied from outside of the cage 5 by a fan device such as a fan (not illustrated). The cooling air flows from the front F toward the rear R of the cage 5. The cooling air that has flown into the cage 5 passes through the OSFP modules inserted in the slots SL1 and SL2 of the cage 5 and moves to the connector 7. The cooling air flowing above the connector 7 passes through the clearance formed by the pillars 20U1 provided on the upper surface of the upper part 20U of the second connector part 20 and flows from the front F to the rear R of the upper part 20U, as illustrated by the arrow FL1 in FIG. 8.

Figure 11:
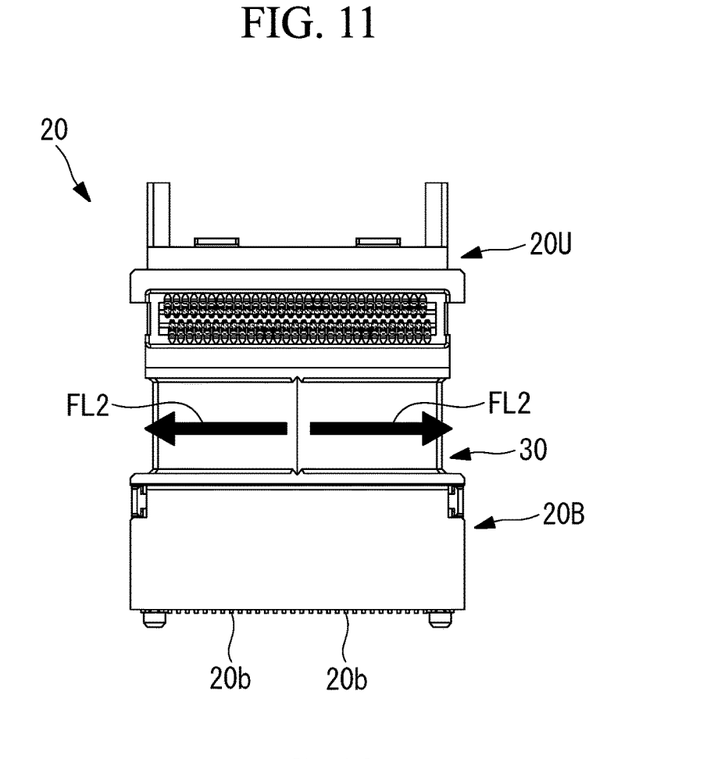
FIG. 11 is a front view of the second connector part of FIG. 8.

The cooling air flowing in the middle area in the height direction of the connector 7 flows toward the intermediate part 30, as illustrated by the arrow FL2 in FIG. 8. The air that has flown to the intermediate part 30 laterally branches at the triangular prism part 30b, passes by the side part 20B1 of the back part 20B, and flows to the rear R (in addition, see FIG. 9 and FIG. 11). In such a way, a cooling flow path indicated by the arrow FL2 is formed, cooling air is caused to flow in the arrow FL2 direction, and thereby an area near the upper side of the first connector part 10 is cooled.

The cooling air that has flown in the connector 7 is discharged to outside via respective cooling holes 5b formed in the cage 5.

Effect and Advantage of the Present Embodiment

According to the connector assembly 1 described above, the following effects and advantages are achieved.

Since the first connector part 10 and the second connector part 20 are stacked on each other, it appears that the intermediate part 30 provided between the first connector part 10 and the second connector part 20 may be a resistance to a flow and obstruct a smooth flow of air. In particular, since the first connector part 10 is installed on the substrate 3 and interposed between the second connector part 20 and the substrate 3, there may be a concern about reduced cooling performance.

To address this, a cooling flow path in which air flows in the direction indicated by the arrow FL2 (FIG. 8, FIG. 9, and FIG. 11) from the front F side toward the rear R side of the connector 7 is formed in the intermediate part 30. This enables cooling air to flow so as to pass through the intermediate part 30, and the first connector part 10 can be effectively cooled.

The triangular prism part 30b is provided in the intermediate part 30. The triangular prism part 30b is formed such that the width thereof increases from the front F side toward the rear R side. Accordingly, cooling air that has flown in from the tip side of the triangular prism part 30b flows along the triangular prism part 30b and thereby flows toward both sides of the intermediate part 30, and a smooth cooling flow path can be formed.

The cooling air guided by the triangular prism part 30b is caused to flow along the side part 20B1 of the back part 20B and thereby pass therethrough to the rear R side. This enables air to flow so as to pass through the connector 7 and can further increase the cooling effect.

The second connector part 20 and the intermediate part 30 are integrated with each other and separated from the first connector part 10. Such a separate type configuration can increase flexibility of design or assembly.

The cooling holes 5b are provided in the cage 5 at a position corresponding to the area around the connector 7. Accordingly, cooling air is smoothly discharged to outside, and this can facilitate an air flow flowing in the cage 5.

Note that, in the present embodiment, the connector 7 has been described as the second connector part 20 and the intermediate part 30 being an integral structure and the first connector part 10 being a separate structure from the second connector part 20 and the intermediate part 30. However, the present invention is not limited thereto, and the first connector part 10, the second connector part 20, and the intermediate part all may be an integral structure. This can reduce the number of components. Further, the first connector part 10 and the intermediate part 30 may be an integral structure, and the second connector part 20 may be a separate structure therefrom. Alternatively, the first connector part 10, the second connector part 20, and the intermediate part 30 may be separate structures, respectively.

Figure 12:
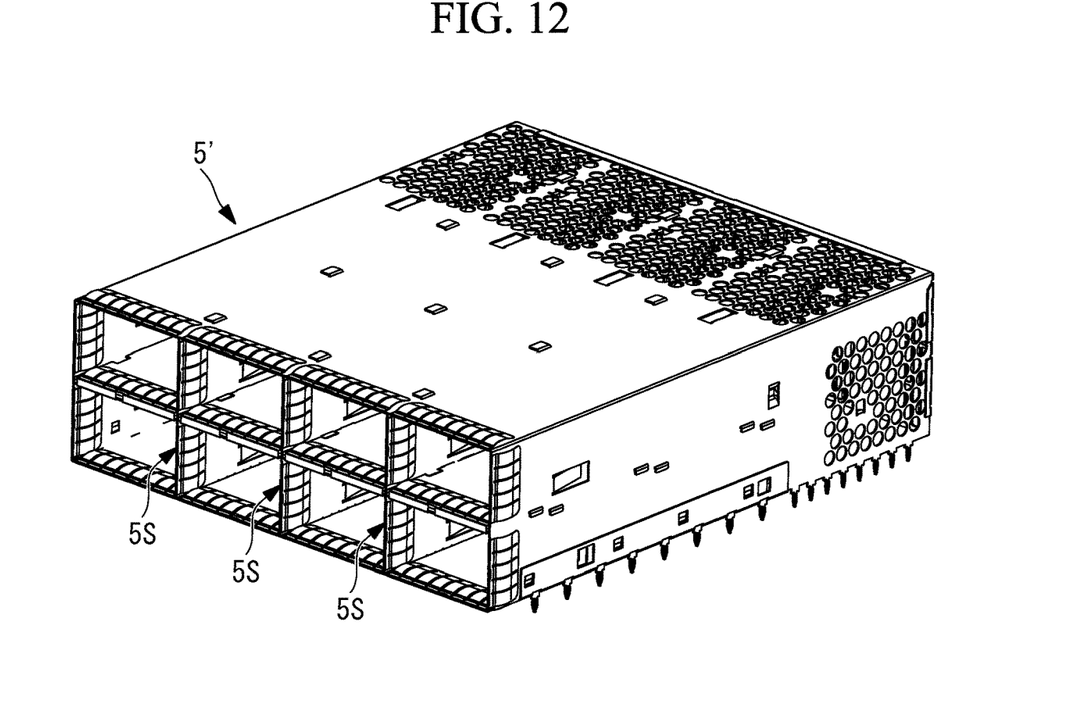
FIG. 12 is a perspective view illustrating a cage as a modified example.

Further, although, in the present embodiment, the 2×1 cage 5 having only one column of the vertically arranged two slots SL1 and SL2 as illustrated in FIG. 1 has been described, the present invention is not limited thereto. For example, a 2×N (N is an integer greater than or equal to two) cage may be employed. FIG. 12 illustrates a 2×4 cage 5' as an example thereof. In a case of a cage 5' having a plurality of columns as illustrated in FIG. 12, partition plates (partition walls) 5S partitioning respective columns are provided.

Figure 13:
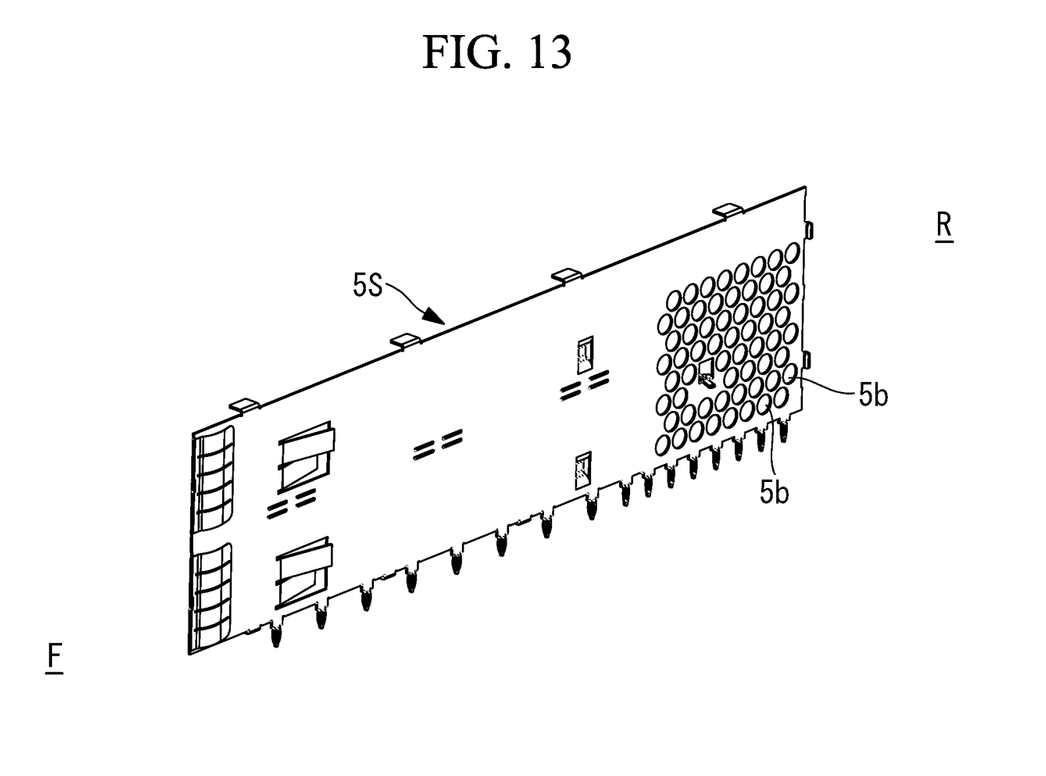
FIG. 13 is a perspective view illustrating a partition plate of the cage of FIG. 12.

As illustrated in FIG. 13, it is preferable to provide a plurality of cooling holes (through holes) 5b at a position corresponding to the connector 7 on the rear R side of the partition plate 5S. This can form a flow of air (cooling medium) interposing the partition plate 5S and further enhance the cooling efficiency.

REFERENCE SIGNS LIST 1 connector assembly (connector assembly for photoelectric conversion modules)
3 substrate
5 cage
5a hook
5b cooling hole (discharge flow path)
5B back wall
5L left side wall
5R right side wall
5S partition plate
5U upper wall
7 connector (connector for photoelectric conversion modules)
10 first connector part
10a first module connection part
10b first substrate side connection part
20 second connector part
20a second module connection part
20b second substrate side connection part
20B back part
20B1 side part
20U upper part
20U1 pillar
30 intermediate part
30a horizontal plate
30b triangular prism part (tapered part)
F front
R rear
SL1 slot
SL2 slot

The invention claimed is:

1. A connector for photoelectric conversion modules, the connector comprising:
 a first connector part having a first module side connection part connected to one end of a first photoelectric conversion module in the front of the connector, having a first substrate side connection part connected to a substrate, and installed on the substrate;
 a second connector part provided at a position such that the first module side connection part is interposed between the substrate and the second connector part, having a second module side connection part connected to one end of a second photoelectric conversion module at the front of the connector, having a second substrate side connection part connected to the substrate, and stacked on the first connector part; and
 an intermediate part provided between the first connector part and the second connector part,
 wherein the second connector includes an upper part whose upside is open, wherein an upper surface of the upper part is provided with pillars that form a clearance between the upper surface of the upper part and an upper wall of a cage fixed to the substrate, wherein the clearance between the upper surface of the upper part and the upper wall of the cage serves as a first cooling flow path in which a cooling medium flows from a front side to a rear side of the connector, wherein the intermediate part includes:

a horizontal plate part is arranged under the upper part and spaced apart from the upper part with a predetermined spacing, a tapered part provided between an under surface of the upper part and an upper surface of the horizontal plate, and a side wall connected to a rear side of the tapered part, wherein the horizontal plate has a horizontally extending plate shape, wherein the tapered part has a width increasing from a front edge toward the rear side to which the side wall is connected, and wherein a second cooling flow path in which a cooling medium flows from the front edge of the tapered part through the side wall toward the rear side of the connector is formed in the intermediate part.

2. The connector for photoelectric conversion modules according to claim 1, wherein the first connector part, the second connector part, and the intermediate part are integrally configured.

3. The connector for photoelectric conversion modules according to claim 1, wherein the second connector part and the intermediate part are integrally configured and separated from the first connector part.

4. A connector assembly for photoelectric conversion modules, the connector assembly comprising:

at least one connector for photoelectric conversion modules according to claim 1;

a substrate on which the connector for photoelectric conversion modules is installed; and a cage fixed to the substrate and provided so as to cover the connector for photoelectric conversion modules.

5. The connector assembly for photoelectric conversion modules according to claim 4, wherein a discharge flow path configured to cause a cooling medium around the connector for photoelectric conversion modules to flow to outside is formed in the cage.

6. The connector assembly for photoelectric conversion modules according to claim 4, wherein a plurality of connectors for photoelectric conversion modules are arranged in parallel, and wherein a plurality of through holes are formed in a partition wall of the cage, the partition wall being provided between the connectors for photoelectric conversion modules arranged in parallel.

* * * * *